Dec. 29, 1925.
T. E. DINGWALL
1,567,924
MEANS FOR JOINING OR PERMANENTLY FASTENING ARTICLES TOGETHER OR CLOSING THEM
Filed Feb. 5, 1923
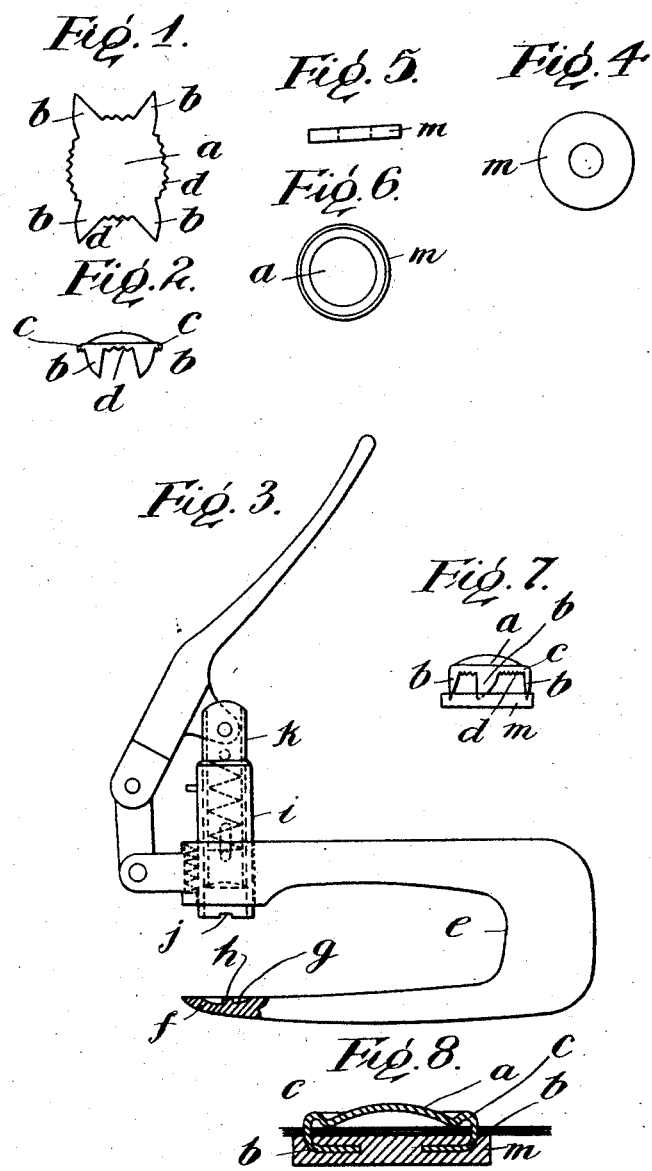
Inventor
T. E. Dingwall
by Ernest Wilkinson.
Attorney.

Patented Dec. 29, 1925.

1,567,924

UNITED STATES PATENT OFFICE.

THOMAS EDMUND DINGWALL, OF HUTTON, ENGLAND.

MEANS FOR JOINING OR PERMANENTLY FASTENING ARTICLES TOGETHER OR CLOSING THEM.

Application filed February 5, 1923. Serial No. 617,109.

*To all whom it may concern:*

Be it known that I, THOMAS EDMUND DINGWALL, a subject of the King of Great Britain, residing at Hutton, Essex, England, have invented certain new and useful Improvements in and Relating to Means for Joining or Permanently Fastening Articles Together or Closing Them, of which the following is a specification.

The present invention relates to improvements in and relating to means for joining or permanently fastening articles together or closing them for preventing and detecting tampering.

According to the present invention the fastening or seal comprises, broadly, two components, one consisting of a penetrable disc or washer, and the other of a metal plate or disc having depending marginal prongs or tangs, which, when the two parts are pressed together, are so directed such as by a curved surface into the penetrable component from the upper face or outer edge thereof that the prong points lie buried or embedded and protected against tampering without injuring or defacing or destroying the penetrable component.

The curved surface above referred to may in general, for ordinary purposes, be provided by a shallow circular concave or other appropriately curved gutter or groove of the anvil of an appropriate driving or clinching tool, in which case the penetrable component is centrally perforated to fit down over the inner circular wall of the groove, which thus forms a positioning element for the penetrable component during driving or clinching.

The figuring and size of the curved surface may be so chosen in relation to the penetrable component that the prong points shall be turned and forced into the penetrable component from the edge thereof after being pressed through the object to be sealed. For example the lower face of the penetrable component may be supported or arranged to be forced during the drive of the pronged component below the plane in which the prong points complete a turn of 90° or thereabouts. Or, otherwise, the arrangement may be such that the prongs or tangs enter the penetrable component from the upper face thereof, being then so directed as to turn over within and lie buried or embedded in the penetrable component.

As two examples of material for the penetrable component, leather board and pressed palm serve well, with a preference on the score of tenacity for the pressed palm.

For further security the outer face or the whole surface of the penetrable component may be covered with a thin coloured paper or appropriate paint or enamel or the like and/or embossed to represent a seal or like.

In order that the present invention may be the more readily understood reference is made to constructional example illustrated in the accompanying drawings, in which:—

Fig. 1 is a blank suited for a string tied post parcel, bag, sack, or like seal.

Fig. 2 is an elevation of the blank, Fig. 1, after shaping ready for use.

Fig. 3 is a side view of a hand lever actuated driver or clincher tool suited for driving the seal shown by Fig. 2.

Figs. 4 and 5 are plan and side elevations of a penetrable disc or washer component for receiving the prong points of the seal, Fig. 2.

Figs. 6 and 7 are plan and side elevations of the penetrable and pronged component in the act of being pressed together.

Fig. 8 is a sectional elevation on an enlarged scale of the fastening components when conjoined for fastening or sealing purposes.

In carrying the present invention into practical effect, a pronged fastener *a* bent from a blank of sheet metal as shewn in Fig. 1 into the form shewn by Fig. 2 serves well for sealing objects such as the end folds of post parcels, bags, sacks, or the like, or for analogous purposes, whether a flexible tie is used or not.

As shown this fastener or seal *a* consists of four marginal prongs *b* so unequally spaced round the crown as to give more space for stringing or the like in one direction than the other.

By preference the head of the fastener is stiffened by a marginal bead *c* and is provided with a serrated depending rim *d* between the prongs *b* for gripping the tie.

A driver or clinching tool suited to drive or clinch such a seal *a* is shewn by Fig. 3 and consists of a staple-like frame *e* having a flattened lower extremity or anvil *f* which is provided with a shallow circular concave gutter or groove *g* surrounding a positioning centre $h$ for receiving the centrally perforated penetrable component hereinafter referred to.

Conveniently and advantageously the positioning centre $h$ is of cylindrical form and rises somewhat abruptly from the bottom of the groove so as to more definitely position and hold the penetrable component in place while manoeuvering the anvil into the desired position in relation to the object or part to be fastened.

The upper extremity of the frame $e$ carries a spring urged sliding barrel $i$ having diametrical notches $j$ at its mouth, and a lever operated plunger $k$ for driving the fastener $a$ placed in the barrel $i$. The notches $j$ are for receiving the string, cord, or the like, and serve as an indicator for correctly placing the fastener $a$ in the barrel $i$ so as to allow the string or like to pass between the prongs.

After driving the plunger $k$ recedes under the influence of a spring and raises the barrel away from the anvil.

$m$, Figs. 4 to 7, show a centrally perforated penetrable component, which conveniently and advantageously is of leather board, suited to fit over the positioning centre $h$ and to receive the prongs or tangs $b$ from the upper face, these prongs or tangs $b$ being so directed by the curved surface of groove $g$ as to fold into and lie buried or embedded in the penetrable component $m$ as shewn by Fig. 8.

By obvious appropriate shaping of the gutter the prong points may be caused to enter the penetrable component from the edge thereof after passing through the object, and I wish it to be understood that this and other variations not departing from the spirit and scope of the present invention are to be regarded as being included in this specification and the claim hereof.

What I claim is:—

A seal comprising a cap having a plurality of prongs extending substantially at right angles thereto for penetration through material to which the seal may be attached, and a penetrable disc, said prong being embedded and overturned in said disc and lying intermediate the opposite faces of the disc to support the disc against said layer of material and prevent detachment of the pronged disc without mutilation of the penetrable disc.

In testimony whereof, I affix my signature.

THOMAS EDMUND DINGWALL.